United States Patent
Iwamizu

(10) Patent No.: US 9,252,693 B2
(45) Date of Patent: Feb. 2, 2016

(54) STEPPING MOTOR DRIVE DEVICE

(71) Applicant: FUJI ELECTRIC CO., LTD., Kawasaki-shi (JP)

(72) Inventor: Morio Iwamizu, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 96 days.

(21) Appl. No.: 14/304,006

(22) Filed: Jun. 13, 2014

(65) Prior Publication Data

US 2014/0375244 A1 Dec. 25, 2014

(30) Foreign Application Priority Data

Jun. 19, 2013 (JP) ................... 2013-128425

(51) Int. Cl.
*H02P 8/00* (2006.01)
*H02P 8/36* (2006.01)

(52) U.S. Cl.
CPC ........................ *H02P 8/36* (2013.01)

(58) Field of Classification Search
CPC ............... H02M 2001/0009; H02M 7/5387; H02P 8/36; G01R 19/0092
See application file for complete search history.

(56) References Cited

U.S. PATENT DOCUMENTS 8,144,177 B2 * 3/2012 Takahashi .......... G06K 15/1219
347/237
2011/0279152 A1 11/2011 Nakahara

FOREIGN PATENT DOCUMENTS

JP 2011-239242 A 11/2011

* cited by examiner

*Primary Examiner* — Karen Masih
(74) *Attorney, Agent, or Firm* — Rabin & Berdo, P.C.

(57) ABSTRACT

In a stepping motor drive device, it is possible to prevent malfunction due to negative current from a stepping motor of a plurality of power MOSFETs that apply drive voltage in a complementary way to paired coils of the stepping motor. A fall delay circuit delays the timing of the fall of input pulse signals applied in a complementary way to the gate of each of a plurality of MOSFETs that apply drive voltage in a complementary way to paired coils of a stepping motor by a time Td, wherein Td>Trise−Tfall, in accordance with a rise time Trise when turning on, and a fall time Tfall when turning off, the relevant MOSFET, and after one MOSFET is turned on, another MOSFET is turned off.

10 Claims, 10 Drawing Sheets

STEPPING MOTOR DRIVE DEVICE

BACKGROUND OF THE INVENTION

1. Field of the Invention

The present invention relates to a stepping motor drive device including a plurality of insulated gate semiconductor elements (for example, power MOSFETs) that apply drive voltage in a complementary way to paired coils of a stepping motor, thus driving the stepping motor.

2. Description of the Background Art

A stepping motor 1 includes a plurality of pairs of coils 3a, 3b, 4a, and 4b provided enclosing a rotor 2, as shown in FIG. 5. FIG. 5 shows a schematic configuration of a main portion of a two-phase unipolar type of the stepping motor 1. The stepping motor 1 is excited by current being caused to flow in a complementary way to the paired coils 3a, 3b, 4a, and 4b, as shown in, for example, FIG. 6, because of which the rotor 2 is rotary driven in increments of a predetermined angle.

FIG. 7 is a schematic diagram of an overall configuration of a stepping motor drive device 10 that drives the stepping motor 1. The stepping motor drive device 10 includes parallel drive circuits 11, 12, 13, and 14 that apply drive voltages Vout1, Vout2, Vout3, and Vout4 in a complementary way to terminals Xa, Xb, Ya, and Yb of the coils 3a, 3b, 4a, and 4b. Input pulse signals Vin1, Vin2, Vin3, and Vin4 generated by a timing generator 15 and having the kinds of predetermined phase difference shown in FIG. 6 are input into the drive circuits 11, 12, 13, and 14 respectively, thus generating the drive voltages Vout1, Vout2, Vout3, and Vout4.

Further, the drive circuit 11 (12, 13, 14) includes an insulated gate semiconductor element, for example, a power MOSFET 22, that is driven on and off by a gate drive circuit 21, generates the drive voltage Vout1 (Vout2, Vout3, Vout4), and applies the drive voltage Vout1 (Vout2, Vout3, Vout4) to the coil 3a (3b, 4a, 4b), as shown in, for example, FIG. 8. Herein, the gate drive circuit 21 receives the input pulse signal, which is provided via a logic circuit 23, and generates a gate signal, thus driving the power MOSFET 22 on and off (for example, refer to JP-A-2011-239242).

Reference sign 24 in FIG. 8 is an overheat detector circuit that detects overheat trouble in the power MOSFET 22 via an unshown temperature sensor. Also, reference sign 25 is an overcurrent detector circuit that monitors the current flowing to the stepping motor (load) 1 via serially-connected resistors r1 and r2. When overheat trouble is detected by the overheat detector circuit 24, or when an overcurrent is detected by the overcurrent detector circuit 25, the logic circuit 23 drives on a protective MOSFET 26 connected to the gate of the power MOSFET 22. By the MOSFET 26 being driven on, the gate voltage of the power MOSFET 22 is compulsorily set to the ground potential, and the drive of the power MOSFET 22 is stopped. Because of this, the stepping motor (load) 1 and power MOSFET 22 are protected from the heretofore described troubles.

Also, when the drive of the power MOSFET 22 is controlled so as to stop by the logic circuit 23 in this way, information thereon is output to the exterior as a status signal ST via a MOSFET 27. Also, when a disconnection of the stepping motor 1, that is, a disconnection of the coil 3a (3b, 4a, 4b) is detected via serially-connected resistors r3 and r4, information thereon is output to the exterior as the status signal ST via a MOSFET 28 provided in parallel with the MOSFET 27.

SUMMARY OF THE INVENTION

Herein, the drive voltages Vout1, Vout2, Vout3, and Vout4 are applied in a complementary way to the paired coils 3a, 3b, 4a, and 4b of the stepping motor 1 based on the input pulse signals Vin1, Vin2, Vin3, and Vin4. Actually, however, the drive voltages Vout1, Vout2, Vout3, and Vout4 output by the power MOSFET 22 are slightly delayed with respect to the input timing of the input pulse signals Vin1, Vin2, Vin3, and Vin4 because of the turn-on characteristics of the power MOSFET 22, that is, a rise time Trise when turning on, as shown by an example in FIG. 9.

Because of this, when turning off, for example, the third-phase power MOSFET 22, there may occur a condition such that the first-phase (opposite phase) power MOSFET 22 paired with the third-phase power MOSFET 22 is not yet carrying out an on-state operation. This kind of condition is liable to occur when driving the stepping motor 1 at a high speed by increasing the frequency of the input pulse signals Vin1, Vin2, Vin3, and Vin4.

Then, in FIG. 10 schematically showing the element structure of the drive circuit 11 (12, 13, 14), it is undeniable that a negative current Iout1 flows between the source and drain of the first-phase power MOSFET 22 from the coil 3a, as shown by an arrow A. The negative current Iout1 is an induction current caused by mutual inductance among the plurality of coils 3a, 3b, 4a, and 4b in the stepping motor 1. Further, the negative current Iout1 divides into the circuit portions of the drive circuit 11 (12, 13, 14), as shown by an arrow B, and forms the base current of a parasitic transistor 29 (refer to FIG. 10) of the MOSFETs 27 and 28, causing the parasitic transistor 29 to carry out an on-state operation.

As a result of this, current flows as shown by, for example, an arrow C in accompaniment to the on-state operation of the parasitic transistor 29, and the status signal ST output via the MOSFETs 27 and 28 changes to an "L" level. Moreover, as the drive current of the power MOSFET 22 is drawn out by the on-state operation of the parasitic transistor 29, the power MOSFET 22 becomes unable to carry out an on-state operation. This state continues for in the region of, for example, several hundred microseconds until the negative current Iout1 dissipates. Therefore, the on-state operation of the power MOSFET 22 is delayed, leading to damage when driving the stepping motor 1 at high speed. Furthermore, the delay also causes malfunction of the MOSFETs 27 and 28 that output the status signal ST to the exterior, and the like.

The invention, having been contrived bearing in mind this kind of situation, has an object of providing a stepping motor drive device with a simple configuration such that it is possible, even when driving a stepping motor at high speed, to prevent malfunction due to negative current from the stepping motor of a plurality of insulated gate semiconductor elements (for example, power MOSFETs) that apply drive voltage in a complementary way to paired coils of the stepping motor.

In order to achieve the heretofore described object, a stepping motor drive device according to an aspect of the invention includes a plurality of insulated gate semiconductor elements (for example, power MOSFETs) provided in parallel that apply drive voltage in a complementary way to paired coils of a stepping motor, thus driving the stepping motor, and a fall delay circuit that delays the timing of the fall of input pulse signals applied in a complementary way to the gate of each insulated gate semiconductor element by a time Td, wherein Td>Trise−Tfall, in accordance with a rise time Trise when turning on, and a fall time Tfall when turning off, the insulated gate semiconductor element.

Herein, the time Td is variably set in accordance with the turn-on and turn-off characteristics of the insulated gate semiconductor element. Also, the stepping motor is, for example, a two-phase unipolar type, and the plurality of insulated gate semiconductor elements perform a role of turning current supplied to each of the paired coils of the stepping motor on and off in a complementary way.

Also, the fall delay circuit sets an on-state period Ton to be long in comparison with an off-state period Toff of the insulated gate semiconductor element by delaying the timing of the fall of the input pulse signal.

According to the stepping motor drive device configured as heretofore described, it is possible when turning off an insulated gate semiconductor element (power MOSFET or IGBT) of a certain phase to ensure that an insulated gate semiconductor element of an opposite phase paired with the insulated gate semiconductor element is in an on-state operation condition simply by delaying the timing of the fall of the input pulse signal when driving the insulated gate semiconductor element on and off. Consequently, even when negative current flows from the stepping motor, the negative current can be absorbed by an insulated gate semiconductor element that is carrying out an on-state operation. Therefore, there is no occurrence of trouble such as the status signal ST changing due to negative current, as has been the case to date.

Consequently, even when driving the stepping motor at high speed by increasing the frequency at which the insulated gate semiconductor element is driven on and off, it is possible to achieve a stabilization of the operation. Also, as the timing of the fall of the input pulse signal is simply delayed under the previously described conditions, the configuration is simple. Therefore, the invention has a large number of practical advantages.

DETAILED DESCRIPTION OF THE INVENTION

Figure 1:
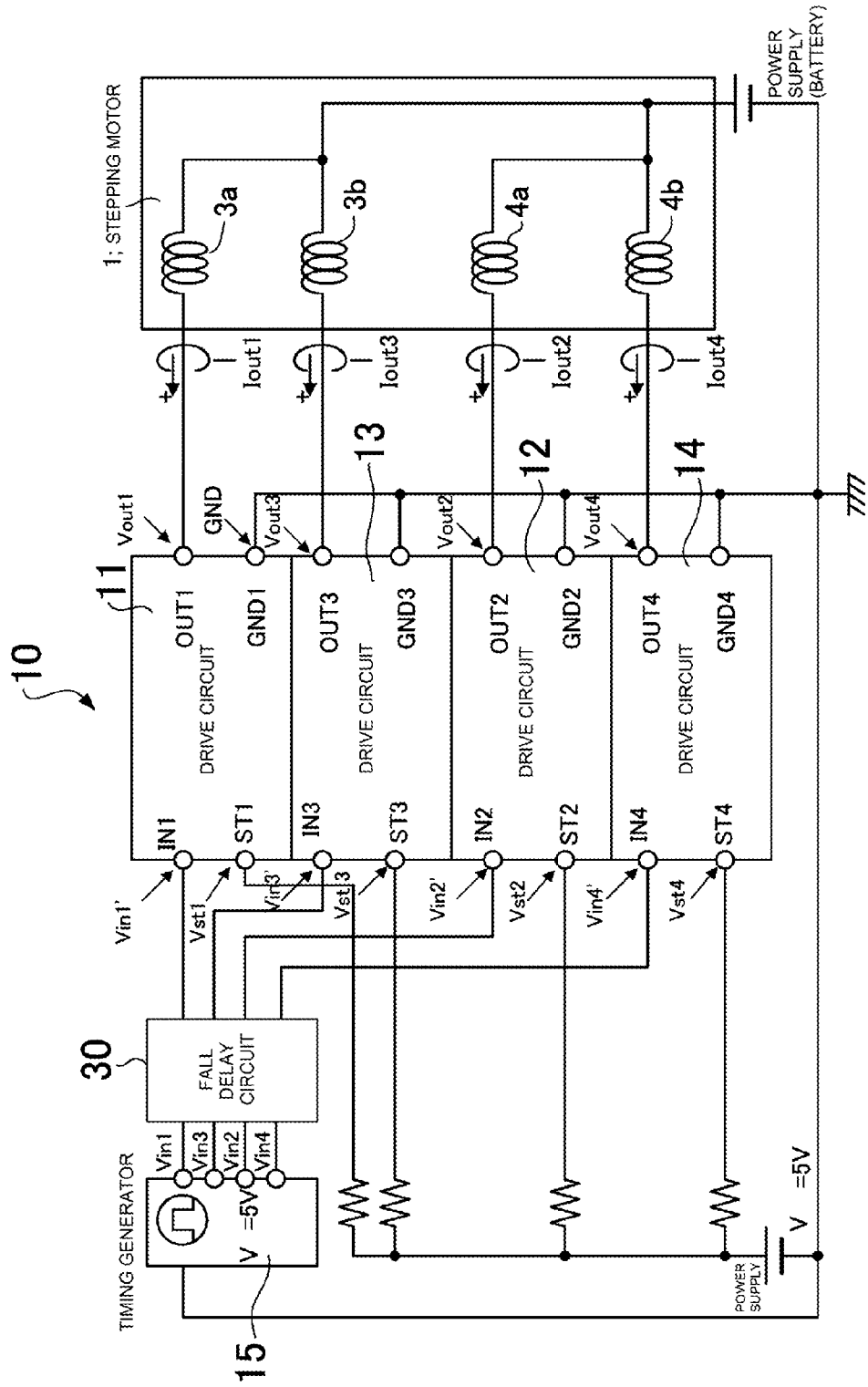
FIG. 1 is a main portion schematic configuration diagram of a stepping motor drive device according to an embodiment of the invention.

Hereafter, referring to the drawings, a description will be given of a stepping motor drive device according to an embodiment of the invention.

Figure 7:
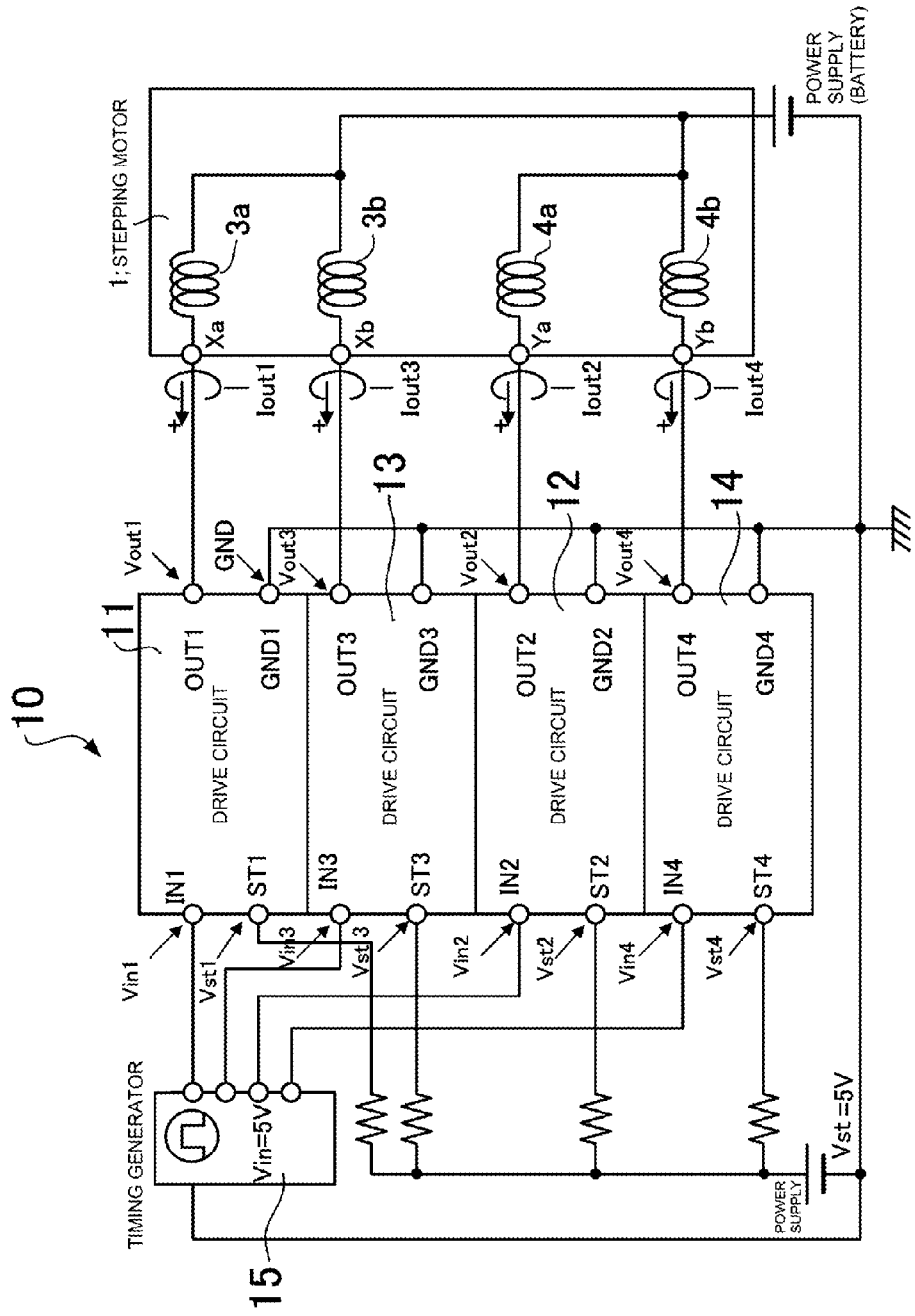
FIG. 7 is a schematic diagram of an overall configuration of a heretofore known stepping motor drive device.
Figure 8:
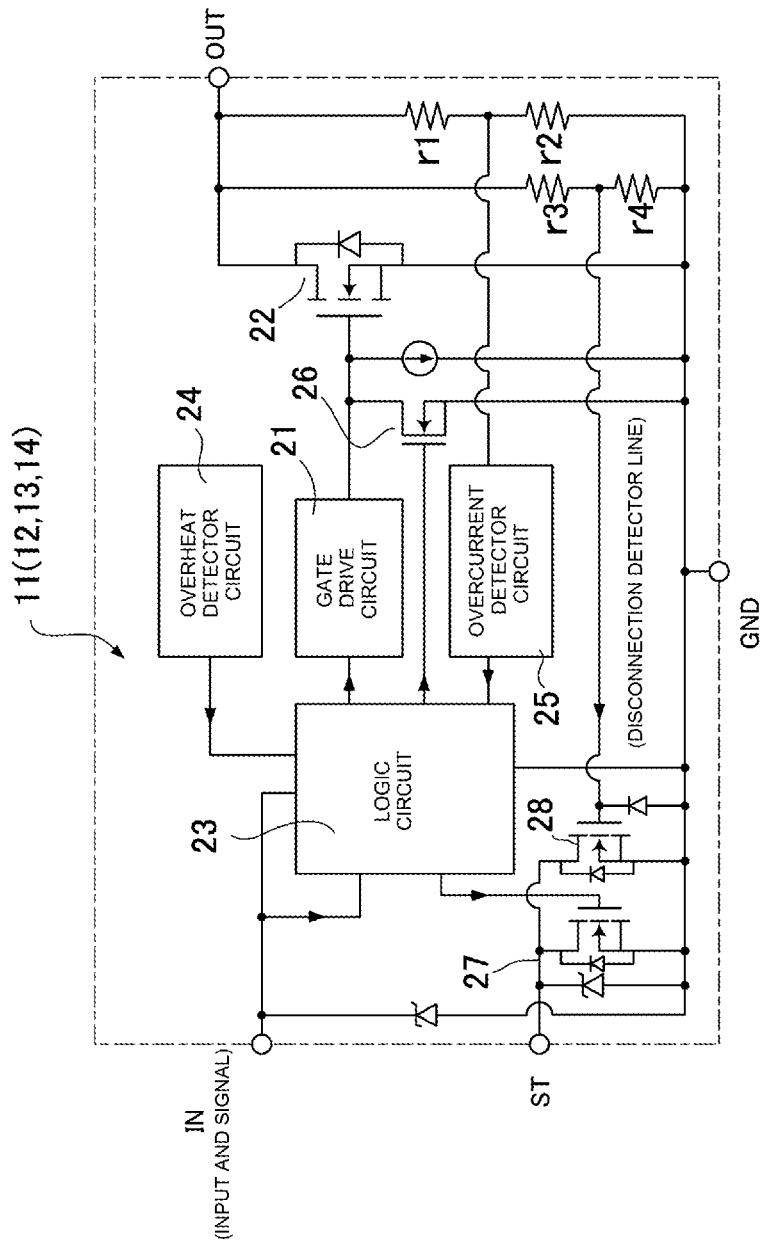
FIG. 8 is a diagram showing a configuration example of drive circuits provided in parallel in a stepping motor drive device.
Figure 9:
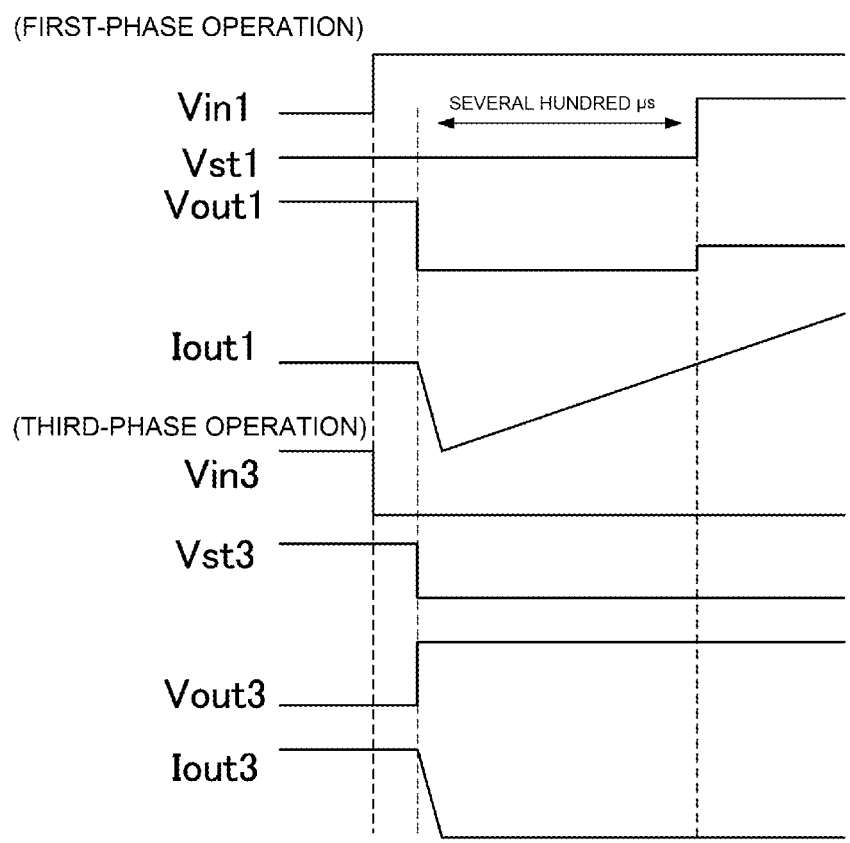
FIG. 9 is a signal waveform diagram showing an operation of the heretofore known stepping motor drive device.
Figure 10:
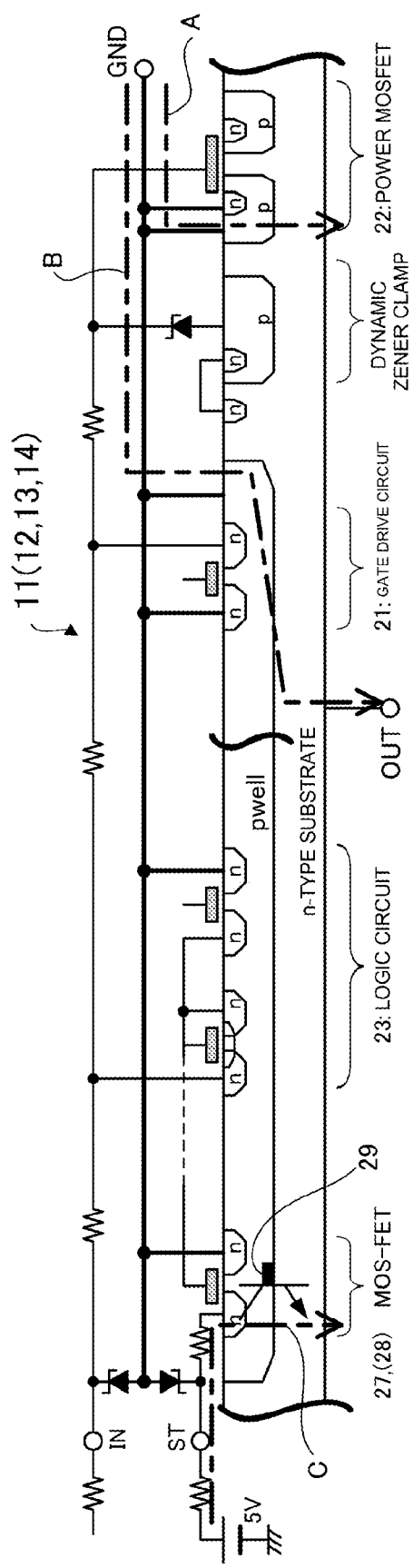
FIG. 10 is a diagram schematically showing a drive circuit element structure and the flow of a negative current flowing from a stepping motor.

FIG. 1 is a schematic diagram of an overall configuration of a stepping motor drive device 10 according to an embodiment of the invention, wherein the same reference signs are given to portions the same as in a heretofore known device shown in FIG. 7. Consequently, a redundant description of identical portions will be omitted.

A characteristic of the stepping motor drive device 10 according to the embodiment is that the stepping motor drive device 10 includes a fall delay circuit 30 that delays the timing of the fall of input pulse signals Vin1, Vin2, Vin3, and Vin4 generated by a timing generator 15 and provided to drive circuits 11, 12, 13, and 14 respectively. The input pulse signals Vin1, Vin2, Vin3, and Vin4 are generated with predetermined phase differences, as previously described, and are signals for exciting in a complementary way paired coils 3a, 3b, 4a, and 4b of a stepping motor 1.

Figure 2:
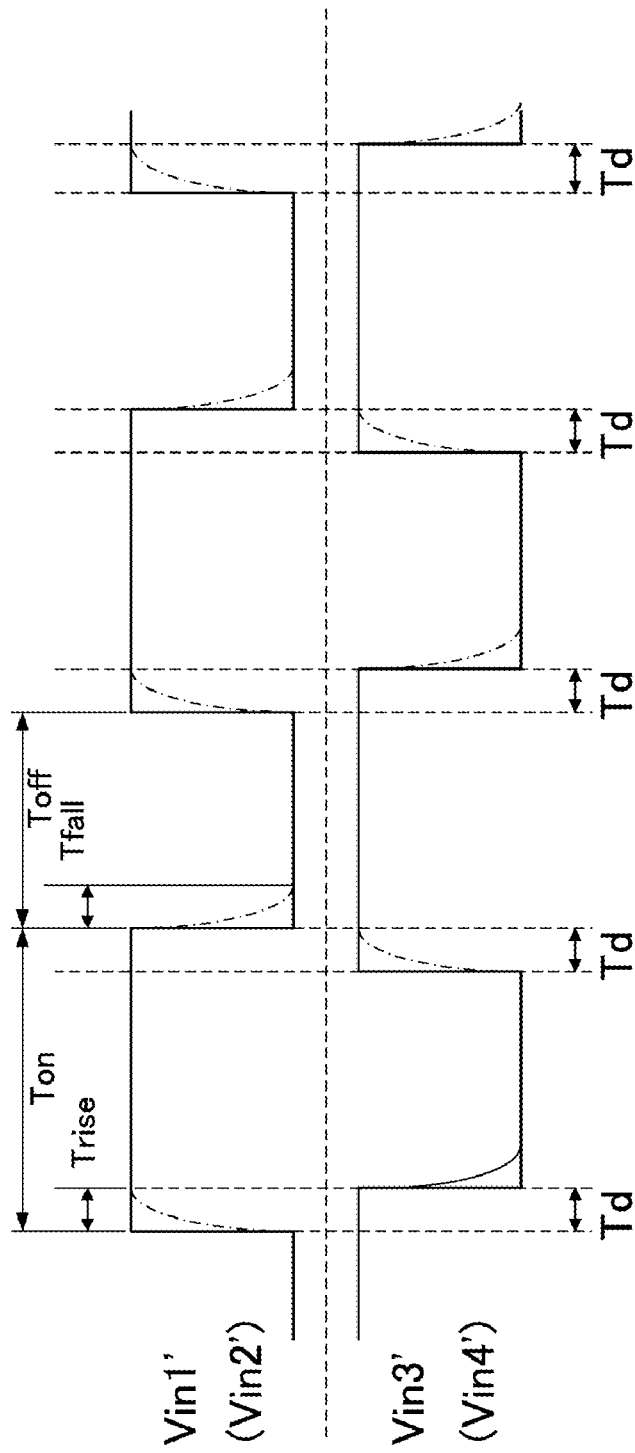
FIG. 2 is a diagram for illustrating an operating principle of the invention.

Further, the fall delay circuit 30 performs a function of delaying the timing of the fall of each of the input pulse signals Vin1, Vin2, Vin3, and Vin4 by a time Td, wherein $Td > Trise - Tfall$, in accordance with a rise time Trise when turning on, and a fall time Tfall when turning off, a power MOSFET 22, such as those shown in, for example, FIG. 2.

Specifically, the fall delay circuit 30 delays the timing of the fall of each of the input pulse signals Vin1, Vin2, Vin3, and Vin4 by, for example, 10 μs, so as to satisfy the condition that $Td > Trise - Tfall = 12 - 2.5(\mu s) = 9.5(\mu s)$ when the rise time Trise when turning on the power MOSFET 22 is 12 μs and the fall time Tfall when turning off the power MOSFET 22 is 2.5 μs.

Figure 6:
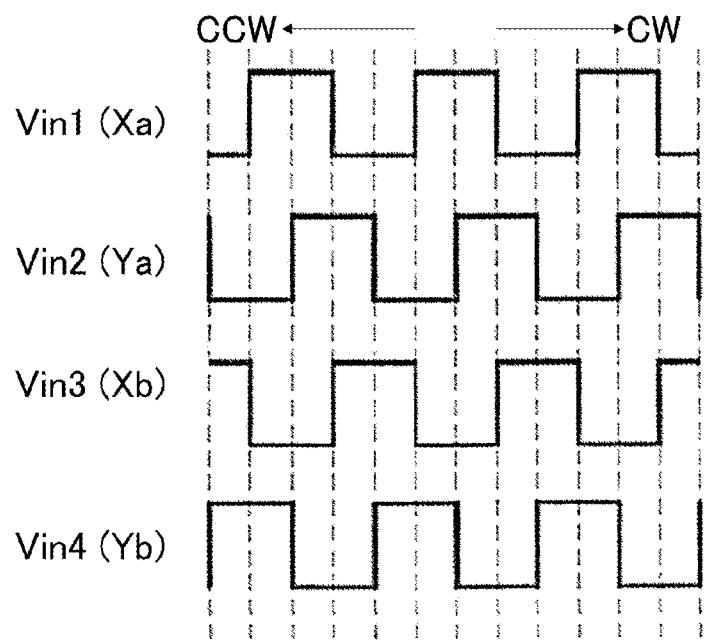
FIG. 6 is a drive voltage waveform diagram showing an example of driving a stepping motor.

Consequently, in comparison with the input pulse signals Vin1, Vin2, Vin3, and Vin4 shown in FIG. 6, input pulse signals Vin1', Vin2', Vin3', and Vin4' applied to the gate of the power MOSFET 22 in each of the drive circuits 11, 12, 13, and 14 are such that an on-state period Ton of the power MOSFET 22 is extended by the delay time Td, and conversely, an off-state period Toff of the power MOSFET 22 is shortened by the delay time Td, as shown in FIG. 2. Further, the power MOSFETs 22 are driven one each by the input pulse signals Vin1', Vin2', Vin3', and Vin4', wherein the on-state period Ton is set to be longer than the off-state period Toff.

Figure 3:
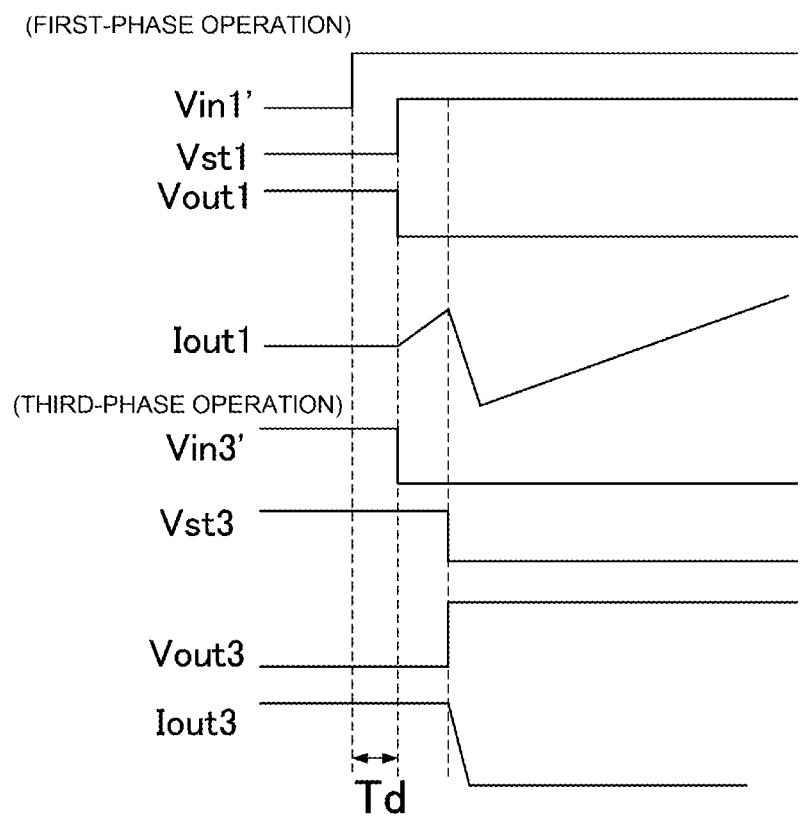
FIG. 3 is a signal waveform diagram showing an operation of the stepping motor drive device shown in FIG. 1.
Figure 4:
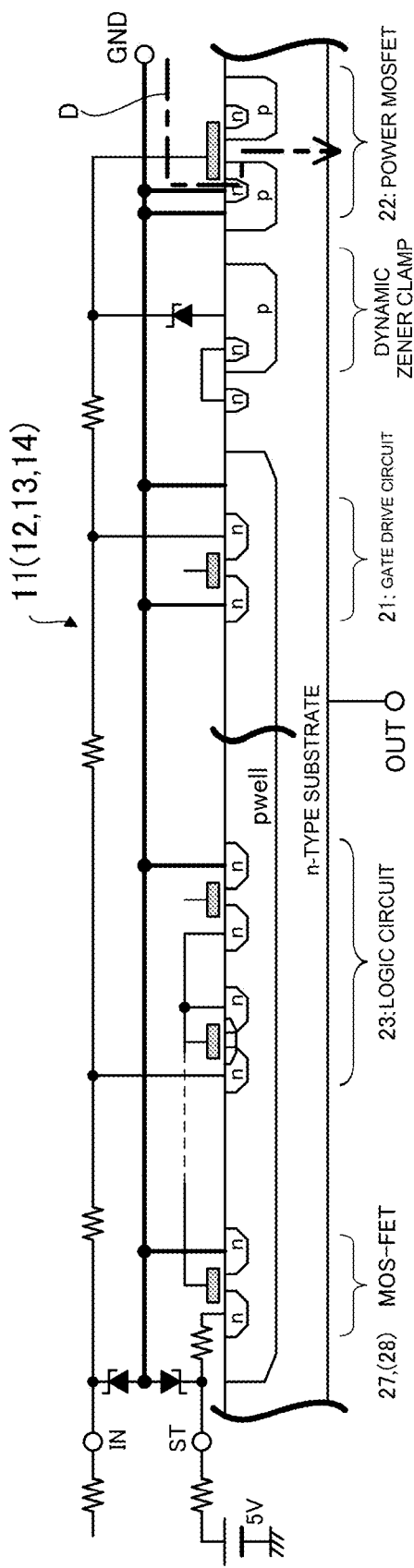
FIG. 4 is a diagram schematically showing a drive circuit element structure and the flow of a negative current flowing from a stepping motor.
Figure 5:
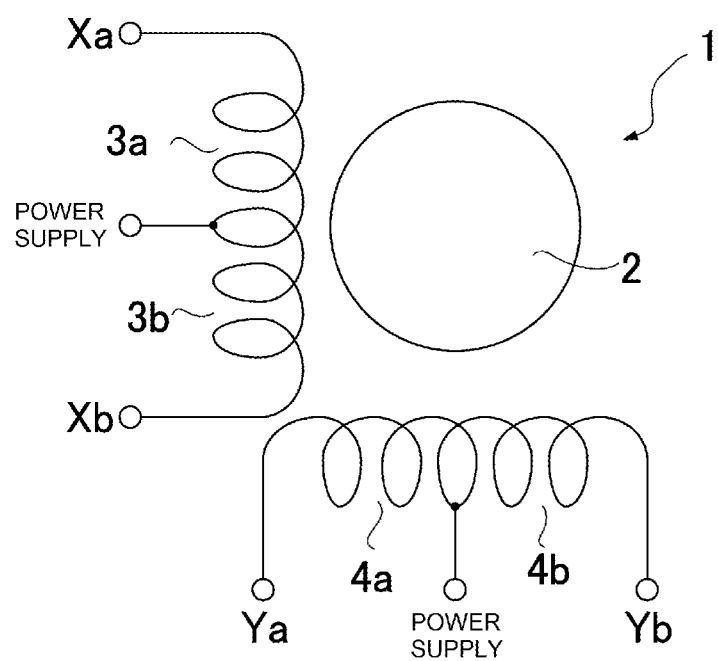
FIG. 5 is a diagram showing a main portion schematic configuration of a two-phase unipolar type stepping motor.

As a result of this, for example, when turning off the third-phase power MOSFET 22, the first-phase (opposite phase) power MOSFET 22 paired with the third-phase power MOSFET 22 is invariably carrying out an on-state operation, as shown in FIG. 3. Consequently, even when a negative current Iout1 flows in from the stepping motor 1 as a result of turning off the third-phase power MOSFET 22, the negative current Iout1 flows through the first-phase (opposite phase) power MOSFET 22, which is carrying out a turn-on operation, as shown by an arrow D in FIG. 4. In other words, the negative current Iout1 does not flow as far as a parasitic transistor 29 of MOSFETs 27 and 28, as is the case with heretofore known technology.

Consequently, it does not happen that a status signal ST changes to an "L" level owing to the MOSFETs 27 and 28, or the like, malfunctioning because of the negative current Iout1. Also, as the power MOSFET 22 is already carrying out an on-state operation, there is no occurrence either of trouble such as the on-state operation of the power MOSFET 22 being delayed, as is the case with heretofore known technology. Therefore, even when driving the stepping motor 1 at a high speed by increasing the frequency of the input pulse signals Vin1, Vin2, Vin3, and Vin4, it is possible to effectively avoid the heretofore known kind of trouble, and to stably drive the stepping motor 1.

Moreover, as control is simply such as to delay the timing of the fall of each of the input pulse signals Vin1, Vin2, Vin3, and Vin4 under the previously described condition with the fall delay circuit 30, as heretofore described, the control is easy. Also, variable setting of the delay time Td in accordance with the rise and fall characteristics of the power MOSFET 22 is also easy. Consequently, it is possible to construct the stepping motor drive device 10 at a low price, and easily.

The invention is not limited to the heretofore described embodiment. For example, it is, of course, also possible for the fall delay circuit 30 to be incorporated in a logic circuit 23, or the like, in each of the drive circuits 11, 12, 13, and 14. Also, it goes without saying that the invention can also be applied in the same way when driving a three-phase type or five-phase type of the stepping motor 1. Furthermore, an IGBT may also be used as the insulated gate semiconductor element 22, and it is also possible to adaptively set the delay time Td variably in accordance with the temperature characteristics of the insulated gate semiconductor element 22.

Also, in the embodiment, a description has been given on the premise that a general power MOSFET or IGBT is used as the insulated gate semiconductor element, but it is, of course, also possible to apply the invention in the same way when employing a switching element that uses a wide band gap semiconductor with, for example, SiC, GaN, or diamond (C) as the material. Various other modifications are also possible, without departing from the scope of the invention.

What is claimed is:

1. A stepping motor drive device, comprising:
   a plurality of insulated gate semiconductor elements provided in parallel that apply drive voltage in a complementary way to paired coils of a stepping motor, thus driving the stepping motor; and
   a fall delay circuit that delays a timing of a fall of input pulse signals applied in a complementary way to the gate of each insulated gate semiconductor element by a time Td, wherein $Td > Trise - Tfall$, in accordance with a rise time Trise when turning on, and a fall time Tfall when turning off, the insulated gate semiconductor element.

2. The stepping motor drive device according to claim 1, wherein
   the time Td is variably set in accordance with turn-on and turn-off characteristics of the insulated gate semiconductor element.

3. The stepping motor drive device according to claim 1, wherein
   the stepping motor is a two-phase unipolar type, and
   the plurality of insulated gate semiconductor elements turn current supplied to each of the paired coils of the stepping motor on and off in a complementary way.

4. The stepping motor drive device according to claim 1, wherein
   the fall delay circuit sets an on-state period Ton to be long in comparison with an off-state period Toff of the insulated gate semiconductor element.

5. The stepping motor drive device according to claim 1, wherein
   the plurality of insulated gate semiconductor elements are power MOSFETs or IGBTs.

6. An apparatus, comprising:
   a plurality of drive devices configured to apply drive signals to coils of a stepping motor; and
   a timing device configured to generate the drive signals with a predetermined timing for controlling a timing of turning on and turning off the plurality of drive devices;
   wherein the timing device is configured to generate the drive signals so that when a drive device of the plurality of drive devices is turning off, a complementary drive device of the drive device that is turning off is in an on-state operation condition.

7. The apparatus of claim 6, wherein the timing device comprises:
   a timing generator configured to generate, as the drive signals, pulses each having a rise time Trise and a fall time Tfall; and
   a delay device configured to delay a time of a fall of each drive signal by a time Td, where $Td > Trise - Tfall$.

8. The apparatus of claim 7, wherein:
   the stepping motor is a two-phase unipolar type; and
   the timing generator is configured to generate the pulses with predetermined phase differences so that the pulses complementarily excite coils of the stepping motor.

9. The apparatus of claim 8, wherein each drive device includes an insulated gate semiconductor element.

10. The apparatus of claim 9, wherein the insulated gate semiconductor element includes a power MOSFET.

* * * * *